United States Patent [19]
Onjohji et al.

[11] Patent Number: 5,241,984
[45] Date of Patent: Sep. 7, 1993

[54] FLOW VALVE

[75] Inventors: Takashi Onjohji, Tuchiura; Mituo Nakamura, Ibaraki, both of Japan

[73] Assignee: Texas Instruments Incorporated, Dallas, Tex.

[21] Appl. No.: 880,966

[22] Filed: May 8, 1992

[30] Foreign Application Priority Data

May 10, 1991 [JP] Japan .................... 2-135480

[51] Int. Cl.⁵ .............................................. F16K 17/28
[52] U.S. Cl. ...................................... 137/460; 137/462; 137/498; 137/517
[58] Field of Search ............... 137/460, 462, 517, 498

[56] References Cited

U.S. PATENT DOCUMENTS

| | | | |
|---|---|---|---|
| 2,687,745 | 8/1954 | Hackett | 137/460 |
| 3,106,937 | 10/1963 | Sands | 137/462 X |
| 3,683,957 | 8/1972 | Sands | 137/460 |
| 4,022,244 | 5/1977 | Oman | 137/517 |
| 4,141,379 | 2/1979 | Manske | 137/517 X |

Primary Examiner—Stephen M. Hepperle
Attorney, Agent, or Firm—William E. Hiller; Richard L. Donaldson

[57] ABSTRACT

An elastically movable valve having a through hole is installed at a required position in the path of a fluid. At the time of normal operation, the fluid is allowed to pass through the through hole, but if the fluid pressure is increased to a certain level over that of normal operation, the valve is elastically deformed by this high fluid pressure allowing it to come into contact with its valve seat and stopping the fluid flow.

Since it has no sliding part for the motion of a movable valve. The dust are not generated and, the fluid used in a fluid circuit requiring a high degree of cleanness is always guaranteed to have a high degree of cleanness. As there is no space for the fluid to stagnate, the new fluid is not partially contaminated with the previous fluid after exchanging fluid.

In addition to the first described structure, a bypass flow path is mounted connecting the space between the elastically movable valve (first valve) and its valve seat to the flow path on the downflow side of the valve seat, and a second movable valve is arranged allowing opening or closing of the bypass flow path.

By mounting the second movable valve in the bypass flow path, the response of transition from fluid flow stopping to fluid flow resumption becomes fast.

8 Claims, 5 Drawing Sheets

FLOW VALVE

This invention relates to a type of valve device. In particular, this invention relates to a valve device which can be used in the flow path for feeding clean fluid and for the purpose of suppressing excessive flow rate.

PRIOR ART

For equipment used with fluids, if the fluid for feed materials and the fluid for driving are fed with an excessive flow rate, the conditions of the manufacturing process may become difficult to control, and the state may become dangerous. Hence, an excessive flow rate prevention valve is arranged in the flow path of fluid. If the hydraulic pressure becomes higher than a normal level, the excessive flow rate prevention valve is activated, and the flow of the fluid is stopped automatically.

FIG. 7 is a partial cross-sectional view illustrating an example of excessive flow rate prevention valve, and the valve (41) is constructed as follows.

Main body (42) contains upstream flow path (45) connected to upstream pipeline connection portion (52A), movable valve body containing space (46) which contains movable valve body (50), valve seat portion (48), movable part containing space (51) which contains first movable part (53), and downstream flow path (47) which is connected to downstream-side pipeline connection portion (52B). First movable part (53) is supported by a leaf spring (44) and is located in the upper portion of movable part containing space (51).

Cylindrical part (43) which supports second movable part (56) is mounted on main body (42), Main body (42) and cylindrical part (43) are fixed to each other by inserting the hooking portions of ring-shaped hook (55) into their ring-shaped grooves (42a) and (43a), respectively. An inward flange (43b) is set at the upper end of cylindrical part (43), flange (56b) set on the lower end of second movable part (56) is coupled on inward flange (43b), and second movable part (56) is supported by cylindrical part (43).

For second movable part (56), most of this part protrudes to the upper side from cylindrical part (43). This protrusion action is realized by the effect of a magnet. That is, first movable part (53) contains a first magnet (53a), and second movable part (56) contains a second magnet (56a). Magnets (53a) and (56a) are set so that the same poles face each other. Due to the repulsive magnetic field between magnets (53a) and (56a), second magnet (56a) is pushed upward, second movable part (56) moves so that flange (56b) is in contact with inward flange (43b) due to this contact and the aforementioned repulsive magnetic field, second movable part (56) is supported on cylindrical part (43).

The fluid flows through upstream flow path (45), gap (46a) between main body (42) in movable valve body containing space (46) and movable valve body (50), through hole (49) set at the center of valve seat portion (48), space (51a) below leaf spring (44) in movable part containing space (51), and downstream flow path (47).

Movable valve body (50) has an octagonal cross-section, space (46a) formed between movable valve body containing space (46) with a cylindrical cross-section and movable valve body (50), has, for flow of the fluid, a cross-sectional area appropriate to the normal flow of the fluid. Under normal hydraulic pressure, movable valve body (50) is set on bottom portion (42b) of main body (42).

When the hydraulic pressure becomes higher than normal and is over a predetermined level due to the high-speed flow of the fluid flowing through gap (46a), movable valve body (50), and rubber packing (50a), set on the upper end surface of movable valve body (50), is pressed onto valve seat portion (48) so that flow of the fluid is stopped.

If the cause for the pressure increase is removed and the fluid feed equipment is reset to the normal state, second movable part (56) is pressed down. This operation may be carried out manually.

As second movable part (56) is lowered, due to the effect of the repulsive magnetic field described above, first movable part (53) descends against the force of leaf spring (44). Pin (53b), set at the center of the lower end of first movable part (53), is inserted through through hole (49) and pin (50b), set at the center of the upper end of movable valve body (50), is pressed downward. In this way, movable valve body (50) descends to its original position.

As second movable part (56) is no longer pressed down, first and second movable parts (53), (56) rise to their original positions. In this way, the fluid can flow normally.

In the aforementioned scheme, the excessive flow rate of the fluid can be prevented. However, excessive flow rate prevention valve (41) has the following disadvantages.

For example, when the operation is carried out in a clean atmosphere, such as that used in the manufacturing process of semiconductor devices, as movable valve body (50) moves up and down and makes contact with valve seat portion (48), undesirable dust is generated. The undesired dust flows downstream and is fed, together with the fluid, to the next operation stage, thus the cleanliness of the environment decreases. As a result, the quality of semiconductor products or intermediate products are degraded; likewise the yield.

FIG. 8 is a cross-sectional view of the excessive flow rate prevention valve in another example.

Excessive flow rate prevention valve (61) shown in FIG. 8 has the following configuration.

A movable valve body (66) is inserted into recessed portion (62a) of main body (62), in recessed portion (62a) movable valve body (66) is pressed upward by coil spring (69) via valve receiver (68). Inner upper lid (63) and outer upper lid (64) are carried on main body (62). Inner upper lid (63) is pressed on main body (62) by cap nut (65) screwed onto a male thread above the main body. The gap between inner upper lid (63) and main body (62) is sealed by O-ring (70). A diaphragm (67) has its edge portion clamped between inner upper lid (63) and main body (42).

As indicated by the broken arrow, the fluid flows from upstream flow path (71), with a pipe-taper female thread machined on it, to downstream flow path (80), with a pipe-taper female thread machined on it, through the following parts in sequence: first flow hole (72) that connects upstream flow path (71) and space (73) that contains needle (74), space (73), second flow hole (75), space (77) between valve seat portion (76) formed on the periphery of the tip-opening of second flow hole (75) and movable valve body (66), space (78) between main body (42) and valve seat receiver (68), and third flow hole (79). Needle (74) is for setting the adjustment of the fluid flow rate to a prescribed flow rate.

On the other hand, on main body (62), first through hole (81) is set from a portion of the inner peripheral surface near the deepest portion of upstream flow path (71) to the lower surface of inner upper lid (63). First through hole (81) is connected to space (82) between inner upper lid (63) and diaphragm (67) via second through hole (67a) set on diaphragm (67) and third through hole (63a) set on inner upper lid (63). As no flow channel is arranged for flow from space (82), first, second, and third through holes (81), (67a), (63a), and space (82) are always filled with stagnant fluid.

When the hydraulic pressure becomes higher than normal and reaches a predetermined level, the hydraulic pressure of the fluid in space (82) becomes higher than the hydraulic pressure of the fluid in the flow path. Due to this high pressure, the volume of space (82) is enlarged, diaphragm (67) is deformed downward, and movable valve body (66) descends against the force of coil spring (69). Consequently, rubber packing (66a), set on the lower end surface of movable valve body (66), comes in contact with valve seat portion (76), and fluid flow is stopped.

When the cause for increased hydraulic pressure is removed and the hydraulic pressure recovers to the normal level, an amount of fluid corresponding to that in space (82) is moved to the upstream side though third, second, and first through holes (63a), (67a), and (81). In this way, the hydraulic pressure of the fluid in space (82) becomes almost balanced with the hydraulic pressure of the fluid in second flow hole (75), with the aid of the force of coil spring (69), space (82), diaphragm (67), and movable valve body (66) are returned to their original states, and the fluid flow becomes normal.

With regard to excessive flow rate prevention valve (41) in FIG. 7, the amount or dust formed due to the movement of the movable valve body 66 in the value of FIG. 8 is almost negligible as compared to the case for excessive flow rate prevention valve (41) of FIG. 7. However, for the case in which fluid in the flow circuit is removed and replaced by another type of fluid, as the fluid used in the last case in the value of FIG. 8 is left in first, second, and third through holes (81), (67a), (63), and space (82) and is difficult to remove, the residual fluid will be mixed with the fresh fluid. This is undesired.

OBJECT OF THE INVENTION

An object of this invention is to provide a type of valve device which can prevent the aforementioned problems of undesired dust formation and difficulty in fully removing the fluid.

SUMMARY OF THE INVENTION

A valve device is characterized in that a movable valve body made of elastic material and having a through hole is mounted at a predetermined position of a flow path. Under normal hydraulic pressure, the fluid is allowed to flow through said through hole. When the hydraulic pressure becomes higher than said normal hydraulic pressure and reaches a predetermined high hydraulic pressure level, said high hydraulic pressure causes elastic deformation of said movable valve body, which comes in contact with the valve seat portion of said flow path of the fluid, so that said flow path is in a closed state.

A valve device is characterized in that a first movable valve body made of elastic material and having through hole is mounted at a predetermined position of a flow path. Under normal hydraulic pressure, the fluid is allowed to flow through said through hole. When the hydraulic pressure becomes higher than said normal hydraulic pressure and reaches a predetermined high hydraulic pressure level, said high hydraulic pressure causes elastic deformation of said first movable valve body, which comes in contact with the valve seat portion of said flow path of the fluid, so that said flow path is in a closed state. In addition, a second movable valve body is arranged in a bypass flow path which connects the space between said first movable valve body and said valve seat portion to said flow path of the fluid on the downstream side from said valve seat portion, said second movable valve body being allowed to open/close said bypass flow path.

BRIEF DESCRIPTION OF THE DRAWINGS

FIG. 5 is set in the gas flow path of CVD equipment.

DESCRIPTION OF THE PREFERRED EMBODIMENTS

Figure 1:
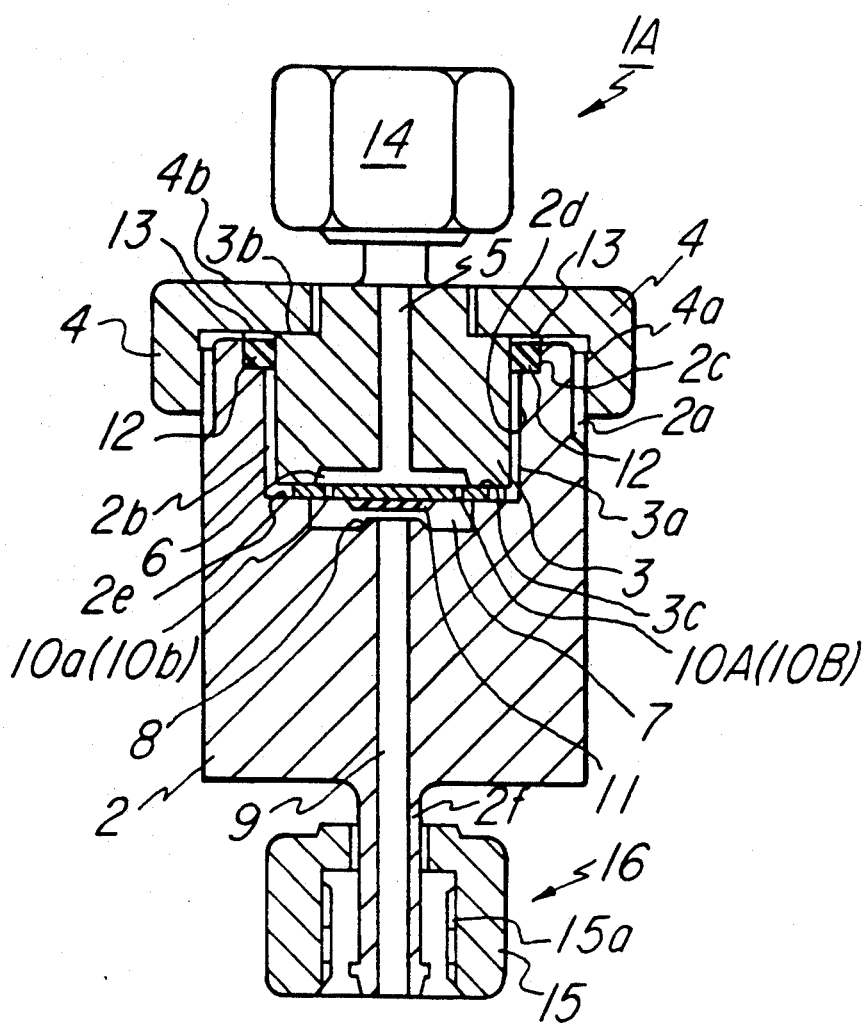
FIG. 1 is a cross-sectional view of an excessive flow rate prevention valve comprising one embodiment of the invention.

Excessive flow rate prevention valve (1A) in FIG. 1 comprising an embodiment of the invention has the following configuration.

A lid (3) is fit into a recessed portion (2b) formed in the upper portion of main body (2) and, female thread (4a) of cap ut (4) is screwed onto male thread (2a) formed on the upper peripheral portion of main body (2). A gasket (12) is inserted in ring-shaped step portion (2c) formed on the upper end surface of main body (2). As cap nut (4) is fastened with respect to main body (2), the lower surface of inward-facing flange (4b) of cap nut (4) comes in contact with the surface of step portion (3b) of lid (3) and presses lid (3) downward. The edge portion of elastic sheet part (movable valve body) (10A) of stainless steel is clamped between edge portion (3c) of the lower end surface of lid (3) and edge portion (2e) of the bottom surface of recessed portion (2b). In this way, elastic sheet part (10A) is fixed. Step portion (2c) of main body (2) and lower edge (3a) of lid (3) are sealed by gasket (12). In the figure, (13) is a washer.

An upstream connection portion (14) is mounted on lid (3), and first flow hole (5) set to connect upstream connection portion (14) is formed. On the lower end of first flow hole (5), a diameter-enlarging portion (6) is formed on the inner side of lower end edge portion (3c).

Second flow hole (9) is formed in main body (2). On the upper end of second flow hole (9), a diameter-enlarging portion (7) which connects the aforementioned upper end and has an enlarging inner diameter is formed on the inner side of bottom edge portion (2e).

On the lower end of main body (2), a downstream connection portion (16) which connects to second flow hole (9) is mounted. Downstream connection portion (16) is comprised of tubular part (2f) which is an extension of main body (2) and a cap nut (15) which is fit on the outer side of the tubular part and has female thread (15a) formed onto it. Upstream connection portion (14) has the same structure as that of downstream connection portion (16). The two connection portions (14), (16) can both be connected to the pipeline not shown in the figure.

Several through holes (10a) are arranged on elastic sheet part (10A). The fluid flows from upstream connection portion (14) to downstream connection portion (16) through first flow hole (5), diameter-enlarging portion (6), through holes (10a) on elastic sheet part (10A), diameter-enlarging portion (7), and second through hole (9).

Figure 2:
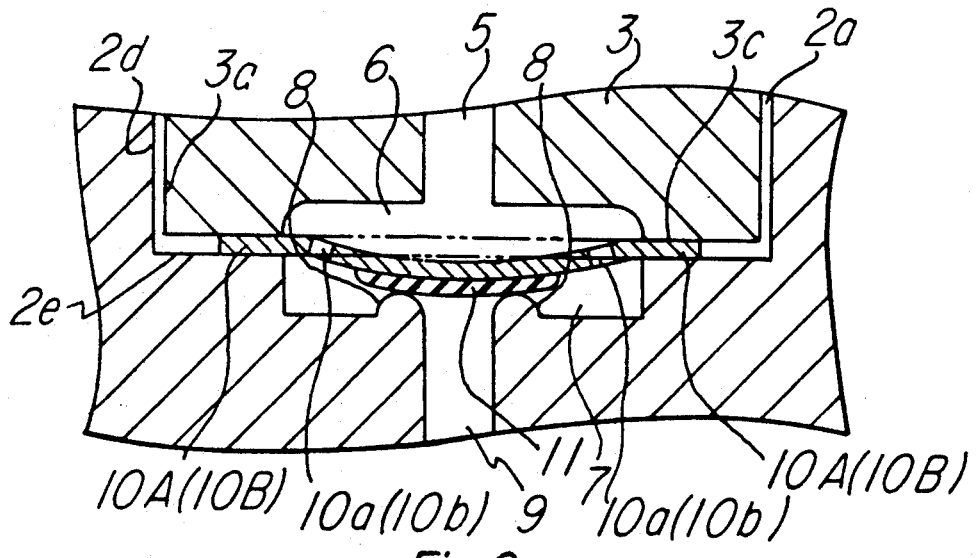
FIG. 2 is a partially enlarged view of FIG. 1 illustrating the shut-off state of fluid flow as the movable valve body is pressed onto the valve seat portion.

In the case in which the hydraulic pressure becomes higher than normal and reaches a predetermined level, the hydraulic pressure in diameter-enlarging portion (6) rises, and elastic sheet part (10A) is deformed by the increased pressure so as to be bent downward. Then, rubber packing (11) fixed on elastic sheet part (10A) is pressed onto valve seat portion (8), and flow of the fluid is stopped. FIG. 2 is an enlarged view illustrating this state. In FIG. 2, the broken line indicates the state in FIG. 1.

As the cause of the increased hydraulic pressure is removed, because the fluid in the diameter-enlarging portion (6) is connected to the fluid in diameter-enlarging portion (7) via through hole (10a), the pressure in the aforementioned two diameter-enlarging portions are balanced, elastic sheet part (10A) recovers its original shape due to its elasticity, and the fluid can flow again.

Figure 3:
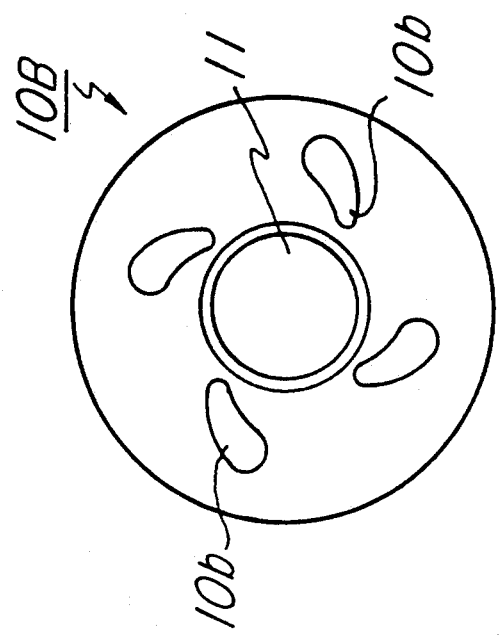
FIG. 3 is an enlarged bottom view of the movable valve body in FIG. 1.

FIG. 3 is an enlarged bottom view of the elastic sheet part. Elastic sheet part (10A) has the shape of a circular sheet, with a plurality (4 in this example) of relatively narrow and long through holes (10a) arranged in a curved shape from the proximity of rubber packing (11) to the proximity of the periphery. As a plurality of through holes (10a) are formed in this way and the total cross-sectional area of the through holes is large, flow of the fluid becomes easier, and the deformation is uniform as a whole in the case of elastic deformation.

Figure 4:
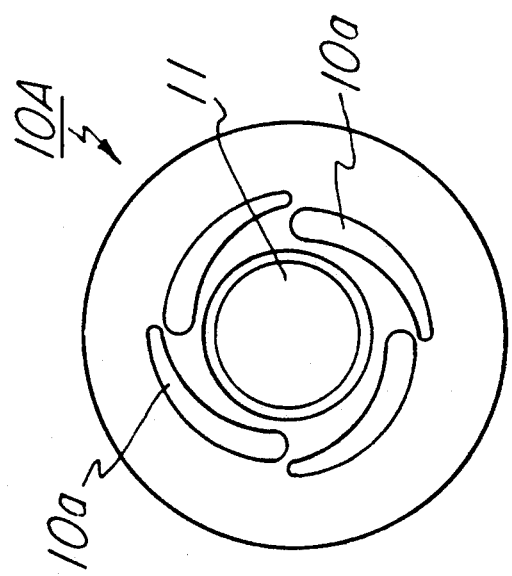
FIG. 4 is an enlarged bottom view of another form of the movable valve body.

FIG. 4 is an enlarged bottom view of another elastic sheet part (10B) with the shape of the through holes changed. In this example, through holes (10b) are wider and shorter than through holes (10a) in FIG. 3. In this way, the durability can be improved because of increasing the distance between through holes (10b).

In excessive flow rate prevention valve (1A), in the operation and recovery processes, elastic sheet part (10A) or (10B) makes only elastic deformation and recovery to the original shape without movement, hence, as there is no sliding part, the aforementioned problem of formation of undesired dust can be prevented. In addition, as the gap between inner surface (2d) of main body recessed portion (2b) and lower outer surface (3a) of lid (3) is very small, in the case of fluid exchange, the aforementioned problem of imperfect exchange of fluids can be reduced to a very low level. Furthermore, as elastic sheet parts (10A) or (10B) play both the role of a movable valve body and the role of a spring, the configuration can be made simpler than for those for conventional excessive flow rate prevention valves, which make use of a combination of a movable valve body and a spring, or a combination of a movable valve body and the repulsive magnetic field generated by 2 magnets, hence, the manufacturing cost can be reduced.

Figure 5:
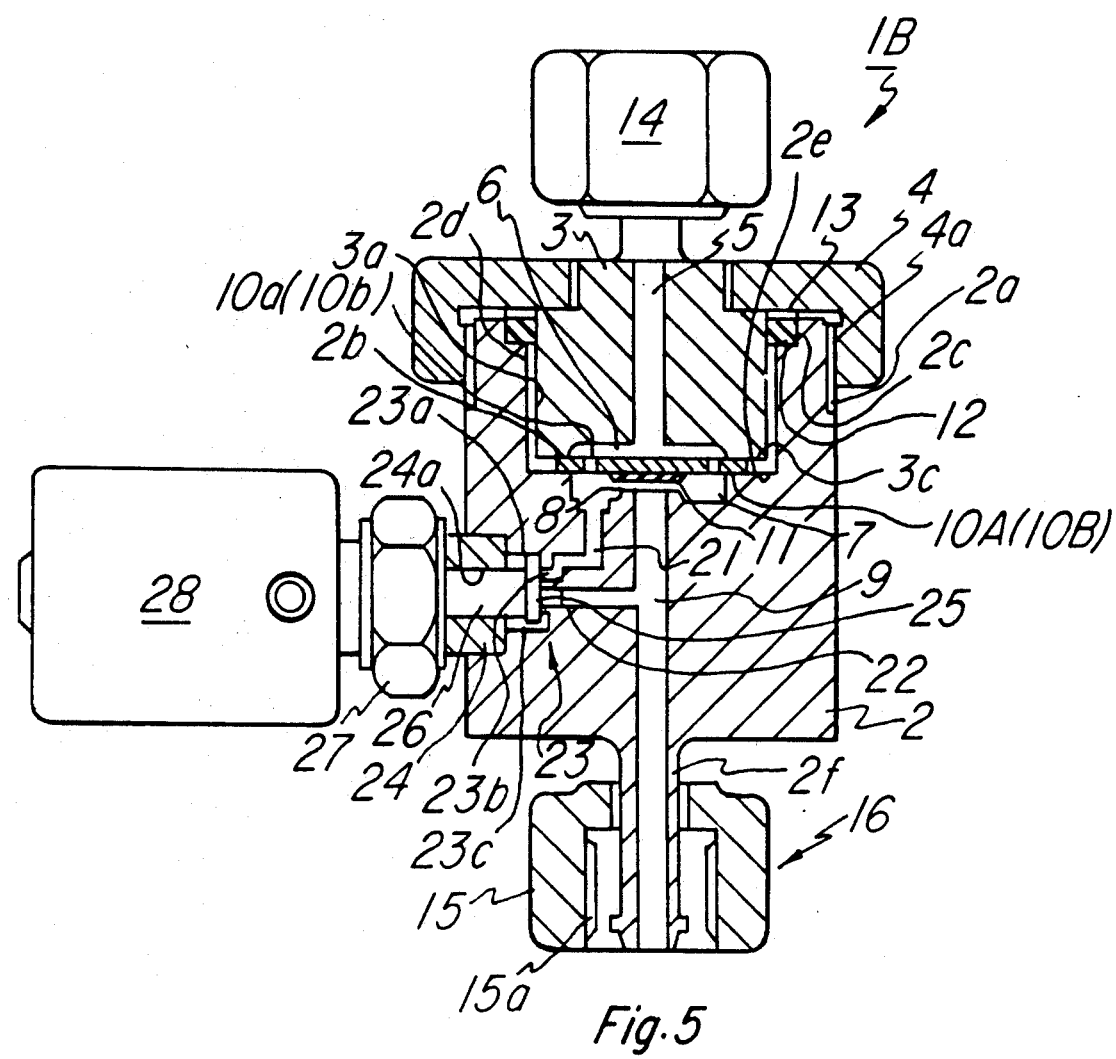
FIG. 5 is a cross-sectional view of an excessive flow rate prevention valve comprising another embodiment of the invention.

FIG. 5 is a cross-sectional view of another embodiment of an excessive flow rate prevention valve according to the invention.

For excessive flow rate prevention valve (1B) shown in FIG. 5, a certain modification is made for main body (2) of excessive flow rate prevention valve (1A) shown in FIG. 1, with another movable valve body arranged separately from the elastic sheet part. A driving part is designed to activate the movable valve body. The same parts as those shown in FIG. 1 are denoted by the same symbols in this case.

An extension hole (21) is formed and extended from diameter-enlarging portion (7) of main body (2), and a branch hole (22) is formed on a position downstream from diameter-enlarging portion (8) of downstream flow hole (9). The tip of extension hole (21) and the tip of branch hole (22) are close each other, and a second valve seat portion (23) which is comprised movable valve body contact surfaces (23a), (23b), (23c) is arranged.

Second valve seat portion (23) is in contact with second movable valve body (25). Valve rod (26) fixed onto second movable valve body (25) penetrates through through hole (24a) of valve guide (24), and as shown in the figure, second movable valve body (25) can make a left-right movement.

On the side surface of main body (2), an air cylinder (28), driven by compressed air, is connected as the movable valve body driving part by cap nut (27). The piston-in-air cylinder (28), as shown in the figure, is usually energized to the right side, and second movable valve body (25), fixed onto the piston via valve rod (26), is pressed onto second valve seat portion (23) so that the space between extension hole (21) and branch hole (22) is usually blocked.

When the hydraulic pressure of the fluid becomes higher than normal and reaches a predetermined level, the state becomes that shown in FIG. 2. Then, as the cause for increase in the hydraulic pressure is removed, compressed air is fed into air cylinder (28) immediately. Valve rod (26) is moved to the left, and second movable valve body (25) is separated from second valve seat portion (23).

In this way, extension hole (21) and branch hole (22) are connected to each other, and the hydraulic pressure in diameter-enlarging portions (6) and (7) and that in flow hole (9) become balanced, hence, elastic sheet part (10) used as the first movable valve body can recover its original shape easily, and the state becomes the reset state. In addition, before recovery is realized, the fluid in upstream flow hole (5) and diameter-enlarging portion (6) flows to downstream flow hole (9) via through hole (10a) on elastic sheet part (10), diameter-enlarging portion (7), extension hole (21), and branch hole (22). As a result, the response of recovery to the normal state for excessive flow rate prevention valve (1B) is faster than that of excessive flow rate prevention valve (1A) shown in FIG. 1. Then, second movable valve body (25) returns to the closed state.

It is also possible to use a movable valve body driving portion activated by a solenoid instead of by the air cylinder.

Figure 6:
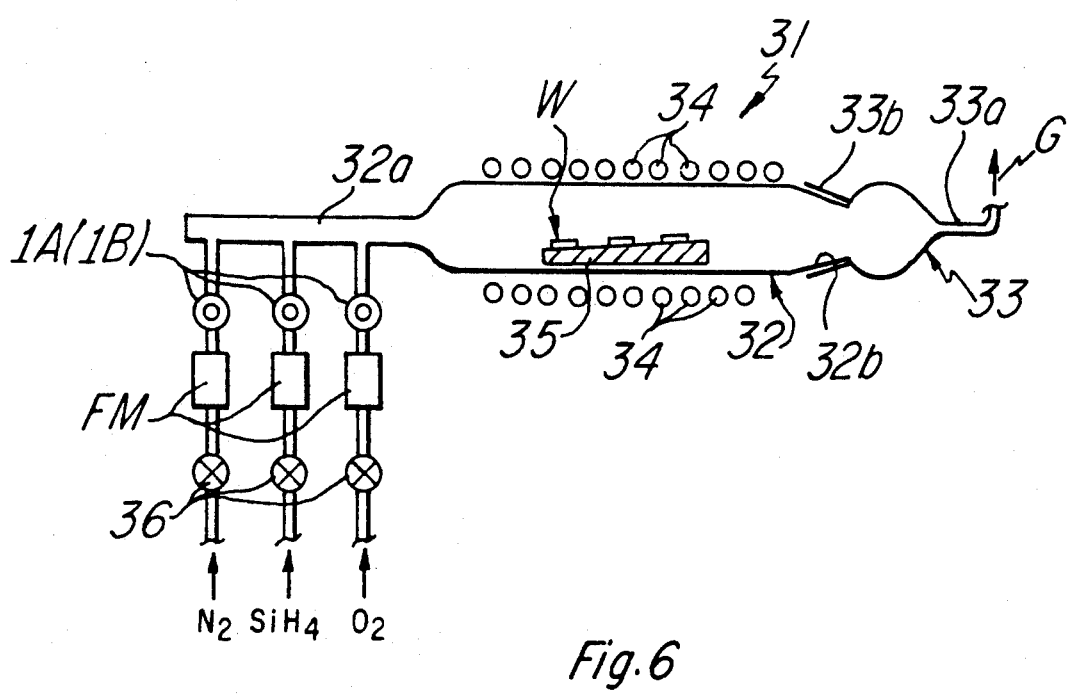
FIG. 6 is a schematic diagram illustrating an example of the case in which the excessive flow rate prevention valve of FIG. 1
Figure 7:
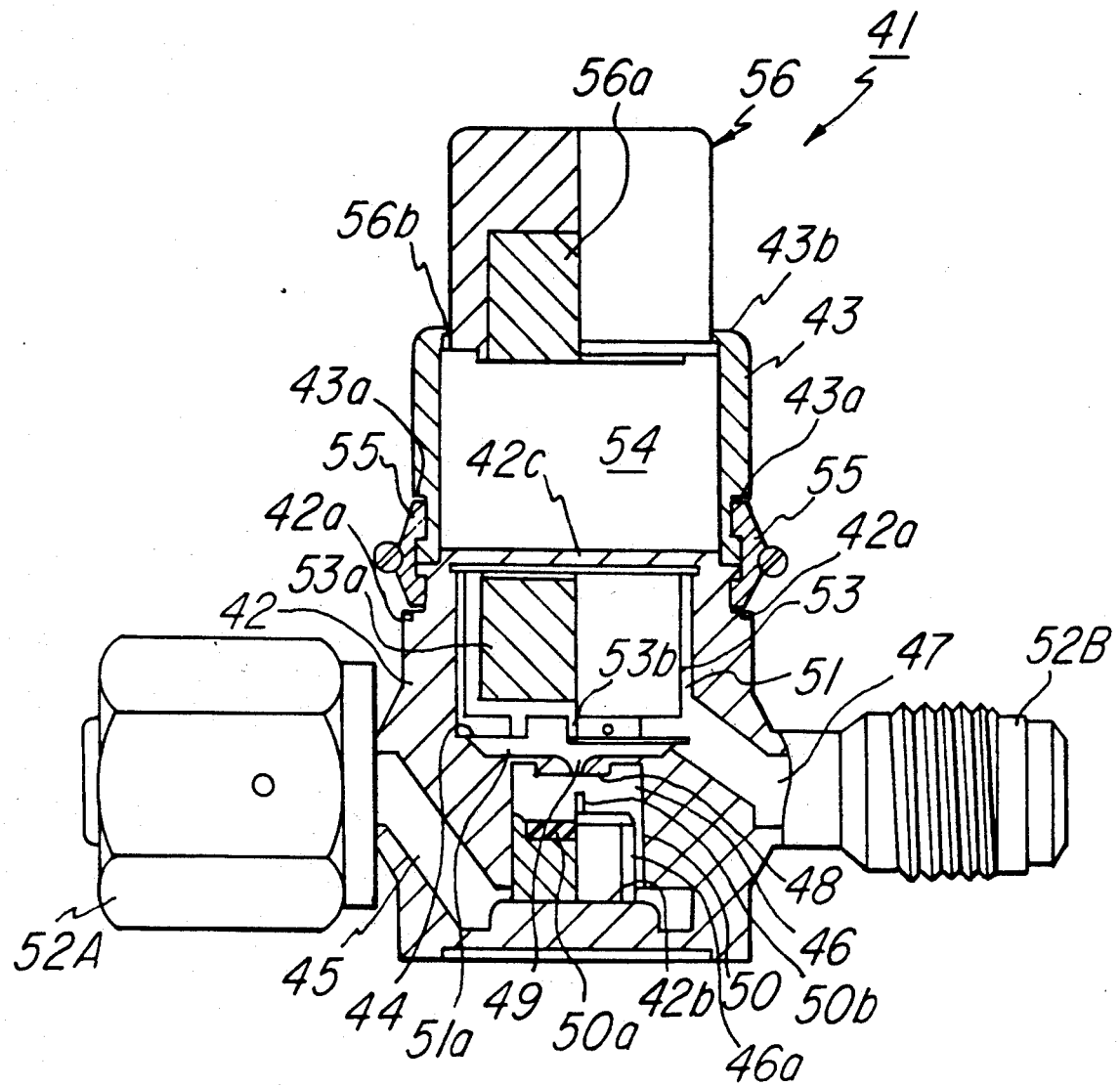
FIG. 7 is a partial cross-sectional view illustrating a conventional excessive flow rate prevention valve.
Figure 8:
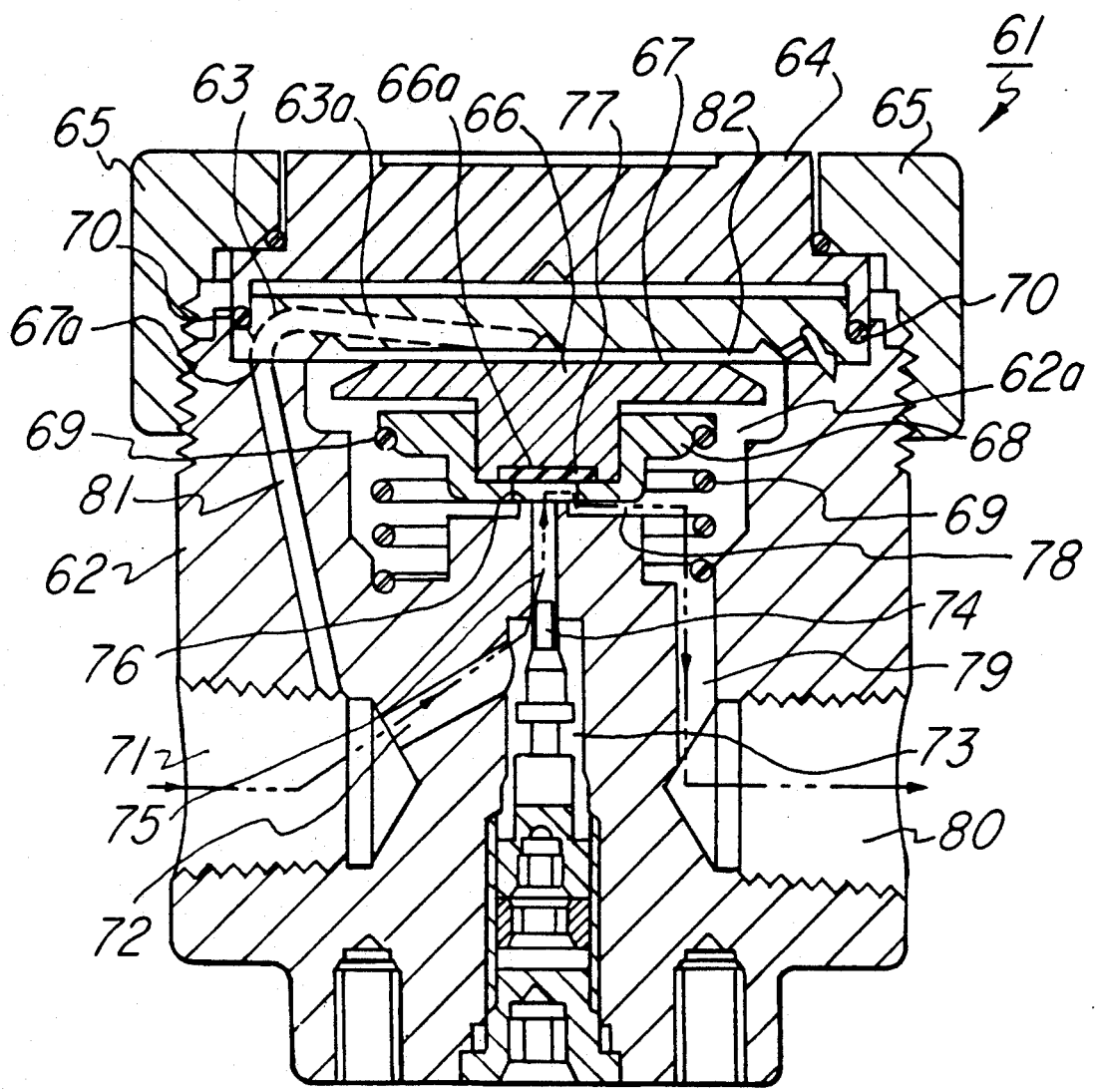
FIG. 8 is a cross-sectional view illustrating another conventional excessive flow rate prevention valve.

FIG. 6 is a schematic diagram illustrating an example in which said excessive flow rate prevention valve (1A) or (1B) is used in the pipeline of CVD (Chemical Vapor Deposition) equipment.

CVD equipment (31) consists of quartz reaction tube (32), quartz cap (33) which has connection portion (33b) for tight connection by sliding fitting with rear end portion (32b) of the aforementioned reaction tube, and a coil (34) for RF heating of the workpiece. At gas inlet portion (32a) of reaction tube (32), monosilane ($SiH_4$) gas, oxygen ($O_2$) gas, and nitrogen ($N_2$) gas used as the carrier gas, are fed into the system in parallel. Each gas passes through pressure-adjusting valve (36), flow meter (FM), and excessive flow rate prevention valve (1A) or (1B) shown in FIG. 1 or FIG. 5 in sequence into gas inlet portion (32a) while the pressure is adjusted. Wafer W, as the workpiece, is loaded in reaction tube (32) together with susceptor (35) used for heating it. As power is turned on for coil (34), susceptor (35) is RF heated, so that the temperature of wafer W is increased. As monosilane reacts with oxygen, a coating of silica ($SiO_2$) is formed by deposition on the surface of wafer W. Gas G, fed for CVD processing, is exhausted via exhaust pipe (33a) of cap (33), and is then stored in a tank not shown in the figure.

In this example, excessive flow rate prevention valve (1A) or (1B) is mounted in the feed pipe of each gas, hence, it is possible to avoid an abnormal increase in the feed rate of any gas, and thus an abnormal increase in the proportion of this gas in the gas mixture. Consequently, CVD processing can be carried out in a stable way. In addition, as monosilane is a toxic and highly explosive gas, its leakage outside the equipment due to a high pressure is absolutely not allowed. However, by using excessive flow rate prevention valve (1A) or (1B), it is possible to reliably prevent leakage of this type of gas.

In addition to the aforementioned effect, another important effect of excessive flow rate prevention valve (1A) or (1B) is that the aforementioned undesirable dust generation can be prevented, hence, the reaction gas can be maintained at a high cleanliness at all times, and the quality of the wafer W, after CVD processing can be guaranteed.

According to the first invention, a movable valve body with a through hole on it and made of elastic material is arranged. In the normal state, the fluid flows through the through hole, when the hydraulic pressure of the fluid becomes higher than normal and reaches a predetermined level, the movable valve body deforms elastically and comes in contact with the valve seat portion so that flow of the fluid is stopped. That is, flow of the fluid is stopped when the movable valve body deforms elastically, and flow is resumed when the movable valve body recovers its original shape. Hence, there is no sliding portion, and undesirable dust is not generated. Consequently, a high cleanliness can be guaranteed when this valve is used in the fluid circuit where a high cleanness is required.

In addition, as there is no need to arrange a fluid-stagnant space in the normal state, when the fluid is to be replaced by a new type, the problem that a portion of the old fluid becomes mixed with the fresh fluid does not exist.

According to the second invention, in addition to the configuration of the aforementioned first invention, a bypass flow path is mounted connecting the space between the said movable valve body (first movable valve body) and the valve seat portion to the downstream flow path from the valve seat portion, and second movable valve body arranged in said bypass flow pass, hence, in addition to the aforementioned effects of the first invention, the recovery response of the valve to its normal state can be increased due to the open/close operation of the second movable valve body. This is because the fluid can flow through the bypass flow path before the fluid flow state is recovered as the first movable valve body recovers its original state when a balance is set up for the hydraulic pressure of upstream and downstream.

What is claimed is:

1. A valve device comprising:
    a valve housing having a flow passage extending therethrough;
    said valve housing being provided with an outwardly opening recess at one end thereof and communicating with the flow passage therethrough;
    said valve housing having a valve seat bounding the flow passage and located at the bottom of the recess in said valve housing;
    the recess in said valve housing having a recess portion of enlarged diameter relative to the remainder of the recess and defining an internal shoulder in said valve housing;
    a flexible valve body mounted on said shoulder in normally spaced relation to said valve seat, said valve body extending across the flow passage in said valve housing and having at least one opening therethrough disposed radially outwardly of the flow passage;
    cap means including a lid number having a flow passage extending therethrough, said cap means being secured to said valve housing with the lid member being received within the outwardly opening recess of said valve housing on the opposite side of said valve body from said valve seat;
    said lid member having a recess provided in the end thereof proximate to said valve body and extending peripherally about the flow passage in said lid member;
    the flow passage in said lid member communicating with the flow passage in said valve housing via said at least one opening through said valve body; and
    said valve body being deformable into contact with said valve seat to close the flow path through said valve housing in response to an increase in fluid pressure in the flow passage in the lid member to a predetermined high fluid pressure level and returning to a spaced relation with respect to said valve seat when the fluid pressure in the flow passage in the lid member drops below the predetermined high fluid pressure level to resume communication between the flow passages in said lid member and said valve housing via said at least one opening through said valve body.

2. A valve device as set forth in claim 1, wherein said flexible valve body comprises a flexible metallic disk, the outer periphery of said flexible metallic disk being clamped between said internal shoulder in said valve housing and said lid member.

3. A valve device as set forth in claim 2, wherein said valve body further includes an elastomer packing disposed on the side of said flexible metallic disk facing said valve seat, said elastomer packing being secured to said flexible metallic disk and having a diameter of sufficient size to close the flow passage through said valve housing when said valve body is deformed into contact with said valve seat with said elastomer packing engaging said valve seat; and said at least one opening through said valve body being located in said flexible metallic disk radially outwardly of said elastomer packing.

4. A valve device as set forth in claim 2, wherein said flexible metallic disk is stainless steel.

5. A valve device as set forth in claim 1, wherein said valve housing is provided with a bypass flow passage extending between the flow passage through said valve housing and the portion of the recess proximate to said valve seat;

said valve housing having a second outwardly opening recess communicating with said bypass flow passage intermediate the ends thereof;

a second valve seat formed in said valve housing and located across the bypass flow passage at the bottom of said second recess;

a second valve body mounted within said second recess and slidably moveable between positions contacting said second valve seat to close the bypass flow passage contacting said second valve said second valve seat to open the bypass flow passage; and means for regulating the movement of said second valve body with respect to said second valve seat for temporarily moving said second valve body out of contact with said second valve seat for opening the bypass flow passage to facilitate balancing of the fluid pressure on opposite sides of said flexible valve body for enabling said flexible valve body to recover its normal shape when the fluid pressure in the flow passage in said lid member returns to a normal fluid pressure level.

6. A valve device as set forth in claim 5, wherein said flexible valve body comprises a flexible metallic disk, the outer periphery of said flexible metallic disk being clamped between said internal shoulder in said valve housing and said lid member.

7. A valve device as set forth in claim 6, wherein said valve body further includes an elastomer packing disposed on the side of said flexible metallic disk facing said valve seat, said elastomer packing being secured to said flexible metallic disk and having a diameter of sufficient size to close the flow passage through said valve housing when said valve body is deformed into contact with said valve seat with said elastomer packing engaging said valve seat; and said at least one opening through said valve body being located in said flexible metallic disk radially outwardly of said elastomer packing.

8. A valve device as set forth in claim 6, wherein said flexible metallic disk is stainless steel.

* * * * *